United States Patent [19]

Berman et al.

[11] E Patent Number: Re. 31,793

[45] Reissued Date of Patent: Jan. 8, 1985

[54] WINDOW SHADE ROLLER ASSEMBLY

[75] Inventors: Joel Berman, 1470 Hewlett Ave., Hewlett, N.Y. 11557; Stephen D. Weinreich, Monmouth Junction, N.J.

[73] Assignee: Joel Berman, Hewlett, N.Y.

[21] Appl. No.: 479,948

[22] Filed: Mar. 29, 1983

Related U.S. Patent Documents

Reissue of:

[64] Patent No.: 4,323,105
Issued: Apr. 6, 1982
Appl. No.: 18,763
Filed: Mar. 8, 1979

U.S. Applications:

[63] Continuation-in-part of Ser. No. 716,153, Aug. 20, 1976, Pat. No. 4,223,714.

[51] Int. Cl.[3] ..... E06B 9/20

[52] U.S. Cl. ..... 160/309; 160/298; 160/319

[58] Field of Search ..... 160/309, 298, 307, 325, 160/319, 263, 249

[56] References Cited

U.S. PATENT DOCUMENTS

| | | | |
|---|---|---|---|
| 27,410 | 3/1860 | Kelty et al. | 160/298 |
| 187,918 | 2/1877 | Sharp | 160/298 |
| 278,038 | 5/1883 | Noyes | 160/298 |
| 1,806,650 | 5/1931 | Schmelz | 160/298 |
| 2,445,607 | 7/1948 | De Ghetto | 188/83 |
| 2,894,577 | 7/1959 | Smith | 160/299 |
| 3,000,591 | 9/1961 | Backlin | 188/83 |
| 3,102,584 | 9/1963 | Znamirowski | 160/307 |
| 3,135,369 | 6/1964 | Nisenson et al. | 160/319 |
| 3,211,212 | 10/1965 | Smith | 160/325 |
| 4,223,714 | 9/1980 | Weinreich et al. | 160/319 X |

FOREIGN PATENT DOCUMENTS

| | | | |
|---|---|---|---|
| 78326 | 9/1919 | Austria | 160/263 |
| 238426 | 8/1925 | United Kingdom | 160/299 |

*Primary Examiner*—Kenneth Downey
*Attorney, Agent, or Firm*—Philip H. Gottfried

[57] ABSTRACT

A shade roller having a chain operated mechanism at one end thereof for controlling the position of the shade on the window, and means for maintaining the chain operated mechanism against a bracket to help insure proper positioning and operation of the said mechanism.

11 Claims, 19 Drawing Figures

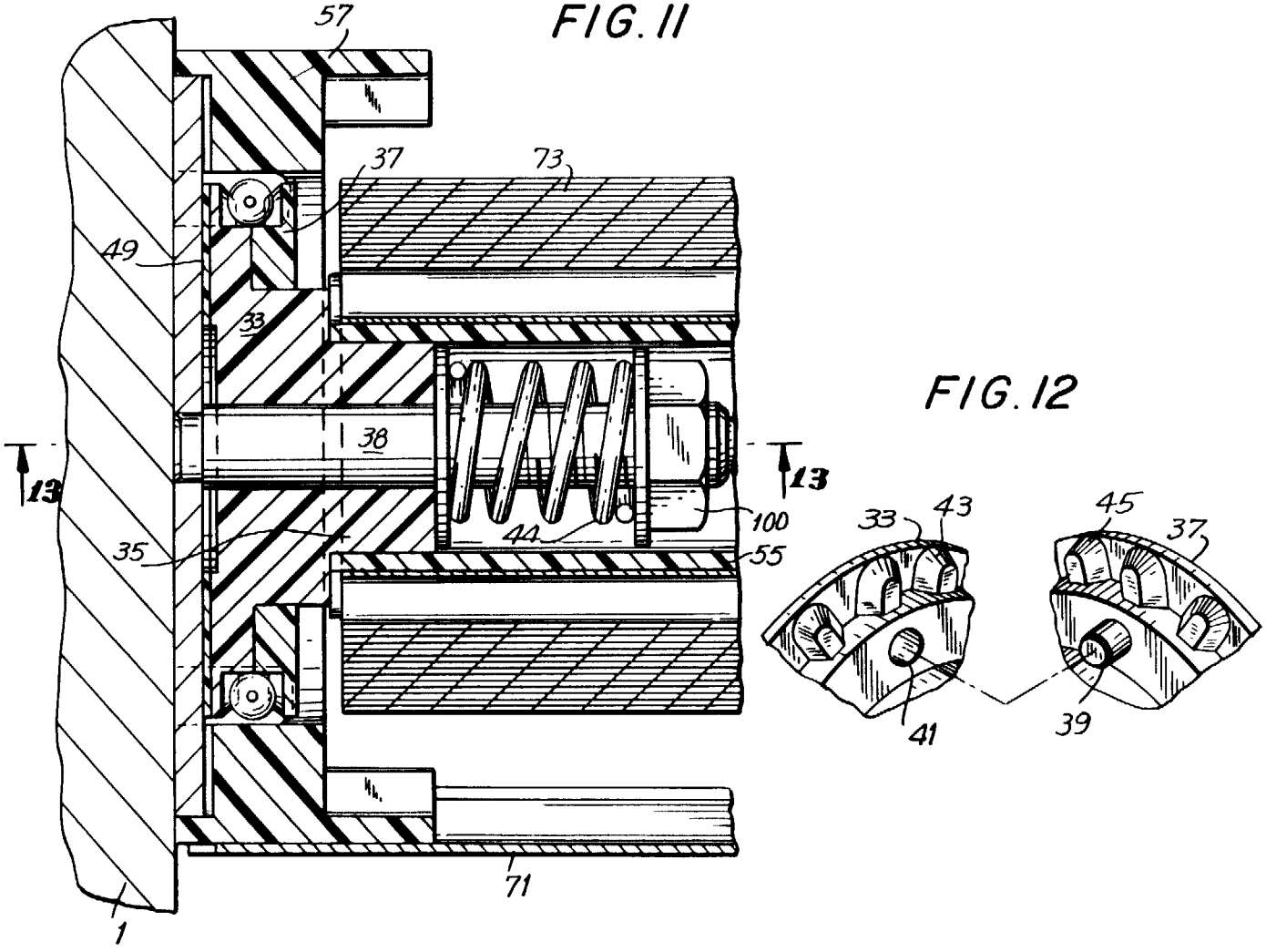
FIG. 12
FIG. 11
37
45
39
43
33
41
13
100
55
73
44
71
57
37
38
33
49
35
1
13
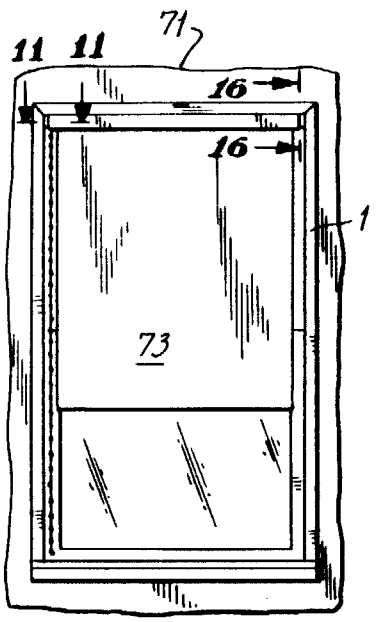
FIG. 1a
1
16
16
71
73
11
11

14
18
22
59
57
15
73
100
44
35
38
37
15
71
14
36
39
49
33
1

1
18
59
31
39
51
38
51
53
36
53
57
55
35
61
63
63
36
36
59
71

FIG. 15
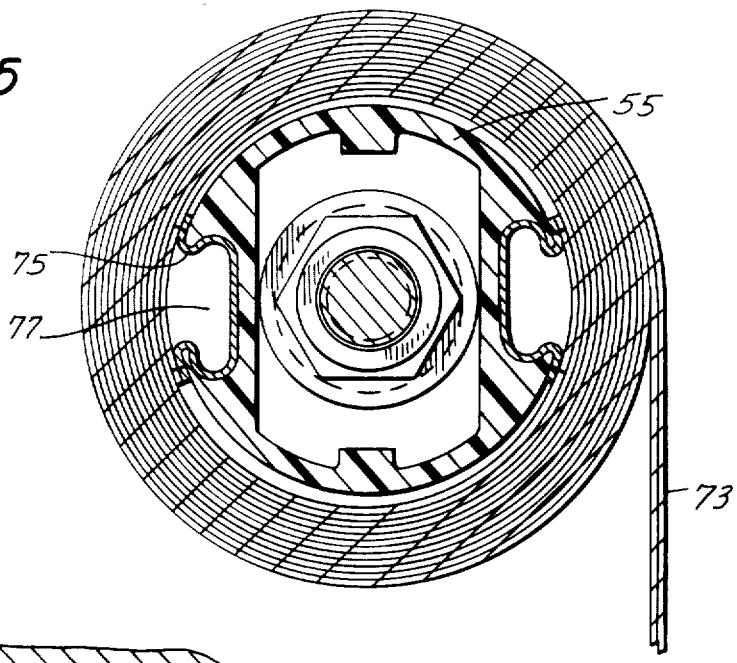
FIG. 16
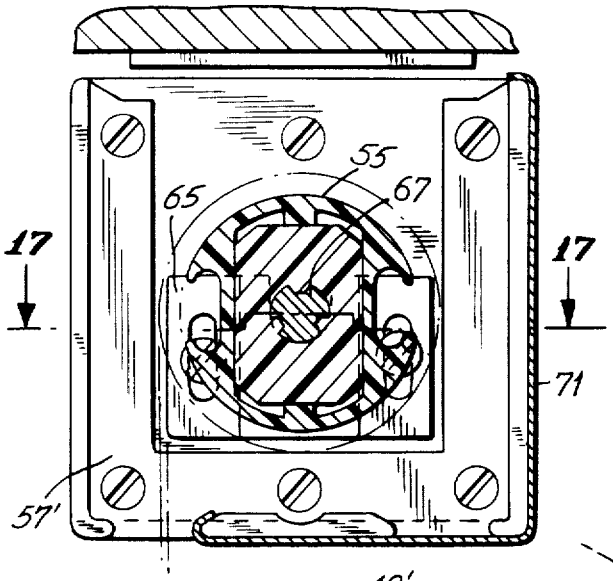
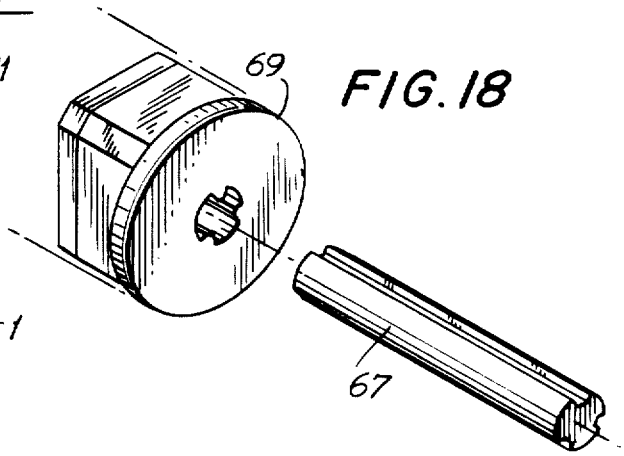
FIG. 18
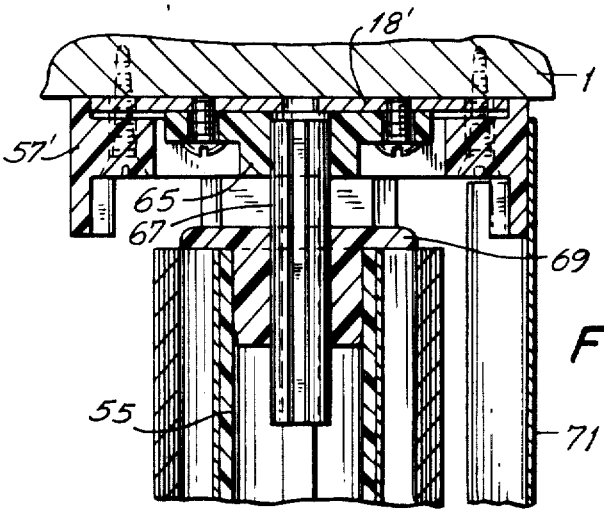
FIG. 17

WINDOW SHADE ROLLER ASSEMBLY

Matter enclosed in heavy brackets [ ] appears in the original patent but forms no part of this reissue specification; matter printed in italics indicates the additions made by reissue.

This application is a continuation-in-part of Application Ser. No. 716,153, filed Aug. 20, 1976, now U.S. Pat. No. 4,223,714.

The present invention relates to shade rollers, preferably for windows, and employs a roll having an opening at one end thereof for accepting a roll operating device. In its preferred form, the roll operating device comprises a chain operated sprocket wheel having an extension which projects into and is disengageably mounted in the roll. In another form, projections on the roll engage openings in the sprocket wheel. In either case, the hub is adapted to engage the roll to cause the roll to rotate in response to movement of the chain.

For best results, a pair of brackets is provided for attachment to the wall, ceiling surfaces or frame surrounding the window. The roll operating device is mounted to one of the brackets. The other end of the roll may be provided with a pin extending therefrom, and the other bracket with means for rotatably receiving the pin. The mounting of the roll to both brackets is preferably non-permanent to allow for removal and replacement of the roll, as well as easy access to operating parts for service and tension adjustment should this ever be needed.

The roller drive mechanism is completely hidden by the shade mounting which is provided with a snap-in facia covering the entire roller shade assembly. The roller drive mechanism itself includes a novel form of sprocket wheel of paddle-shape design which prevents the bead chain from riding up and hitting the surrounding retainer. An adjustable novel disc brake is provided, whose readily accessible tension is adjustable from 0 to 100% of the shade weight.

These and other features of the invention are described in more detail below with reference to the drawings in which like numerals refer to like parts and in which various preferred embodiments of the invention are depicted:

FIG. 1a is a general front elevation of a shade as installed;

FIG. 11 is a partial horizontal cross-sectional view of a further embodiment of the present invention, taken along the line 11—11 of FIG. 1a;

FIG. 12 is a partial exploded perspective view showing construction of a modified form of sprocket wheel;

FIG. 15 is a cross-sectional view along the line 15—15 of FIG. 13;

FIG. 16 is a partial cross-sectional view along the line 16—16 of FIG. 1a;

FIG. 17 is a horizontal cross-sectional view along the line 17—17 of FIG. 16, and FIG. 18 is a perspective view of the idle end of the roller.

Figure 1:
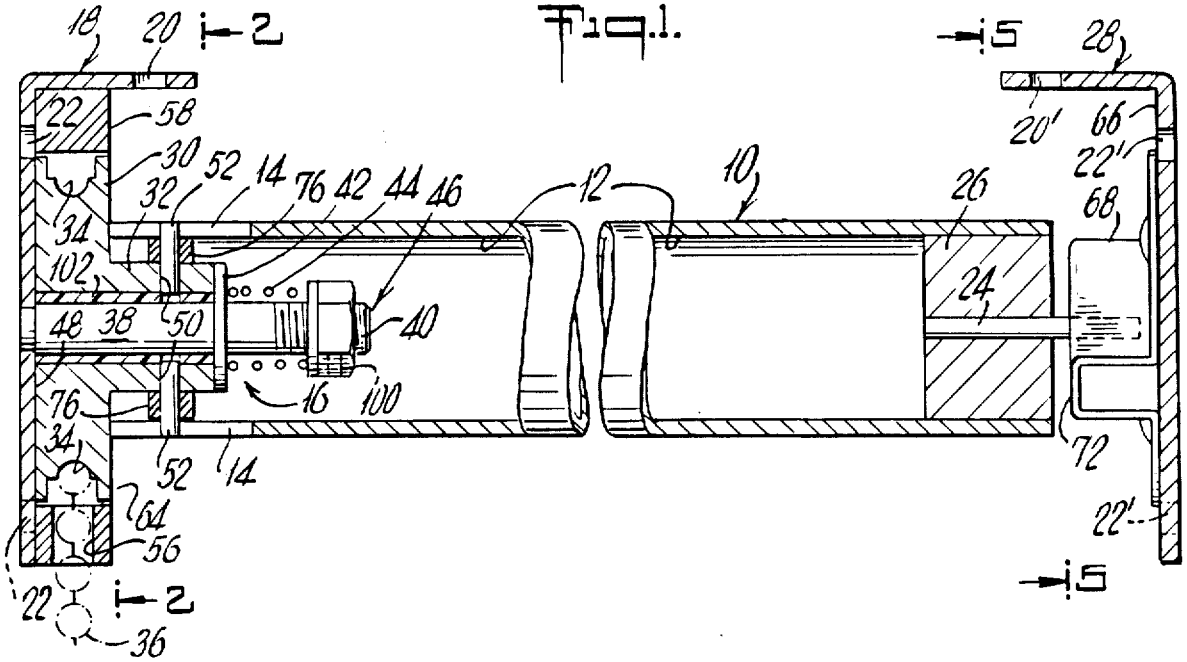
FIG. 1 is a detail view of a preferred embodiment of a window shade roller assembly in accordance with the present invention.

FIG. 1 generally illustrates a window shade roller with mounting brackets, while FIG. 1a illustrates installation in a window frame 1.

With specific reference to FIG. 1, the numeral 10 denotes a roll for receiving a conventional shade (not shown). The roll 10 has an opening 12 and two slots 14 at one end into which is inserted a roll operating mechanism denoted generally by the numeral 16. More slots can be used if desired.

The roll operating mechanism 16 is mounted on a bracket 18. The bracket 18 is provided with a plurality of holes 20, 22 for mounting to the window frame, to the ceiling, or to the wall, depending on which holes are used. Preferably, holes 20 should be used for ceiling or window frame mounting while holes 22 should be used for wall mounting.

The other end of the roll contains a pin or equivalent extension 24, the extension being fixedly mounted in plug 26 which in turn is fixedly mounted in roll 10. Thus, the pin and plug assembly rotate with the roll.

The pin 24 rotatably engages a second mounting bracket 28 which may also be mounted to the ceiling, wall or window frame in the same manner as bracket 18. The mounting holes in second bracket 18 are denoted by the numerals 20' and 22'.

The roll operating device 16 comprises a sprocket wheel 30 having an extension 32 thereon. The hub 30 is larger in diameter than the roll 10 and is provided with a plurality of indentations or depressions 34 for receiving a conventional bead chain (denoted by the numeral 36) or other operating device, such as a sprocket chain. As illustrated, the extension 32 is an integral part of the hub 30, although it should be understood that the extension may be provided as a separate piece which is then affixed to the hub 30.

Bracket 18 has a projecting non-rotatable extension or pin 38 on which the hub 30 and extension 32 are journalled via a nylon or other low friction material bushing 102. The extension 38 extends a selected distance past the end of hub extension 32 and is preferably provided with screw threads 40 as illustrated. A washer 42 is mounted on the extension 38 adjacent the hub extension, along with a spring 44 and a washer and nut assembly 46. Preferably, the nut is of the self-locking variety. Alternatively, a pair of nuts can be used, or a nut with a set screw, such as that denoted by the numeral 100, can be used. As is readily appreciated, the spring 44, braced by the washer and nut assembly 46, urges the entire roll operating device to the left as viewed in FIG. 1. This tends to insure continuing frictional contact of the hub 30 with the inner surface 48 of the bracket 18 both before and after installation of the bracket on the ceiling or wall. This frictional force between hub and bracket tends to prevent the roll from rotating and unwinding the shade which may occur due to the weight of a partially lowered shade.

The hub extension 32 is provided with two or more bores 50 which accept an equal number of operating pins 52. Operating pins 52 project from the hub and ride in the roll slots 14. Upon rotation of the roll operating device 16, operating pins 52 will engage the sides of the slots to rotate the roll to raise or lower the shade.

Although two bores 50 are shown, it is to be understood that three or more, and preferably four, bores may be used. If four bores are used, the roller, when mounted in a window, can be adjusted to horizontally level the shade by simply separating the roll from the hub, rotating the roll one-quarter turn, and replacing it on the hub. Of course, the number of operating pins 52 may be made equal in number to the bores 50.

The bracket 18 may be made of metal, plastic or wood and may be molded or machined or otherwise fabricated to obtain the illustrated configuration. The bracket 18 is formed with a plurality of bead chain receiving channels 56, 56' which are recessed in the face 58 of the bracket.

Figure 2:
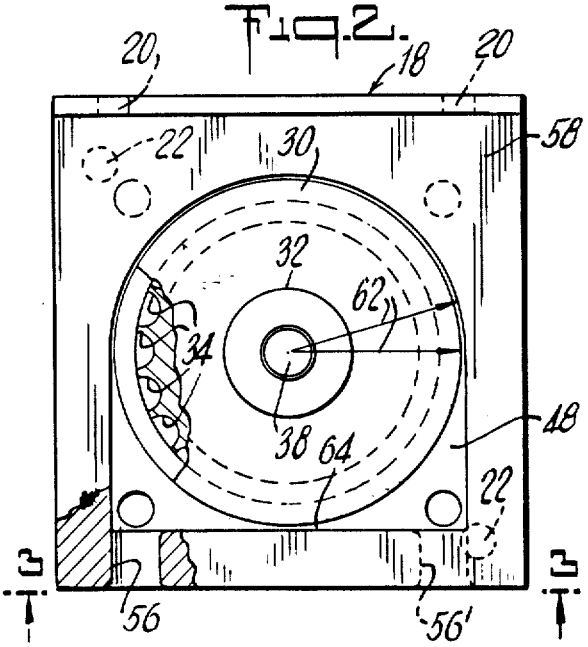
FIG. 2 is a detail view of the bracket which accepts the roll operating device, taken along line 2—2 in FIG. 1 and with the roll operating device removed.
Figure 5:
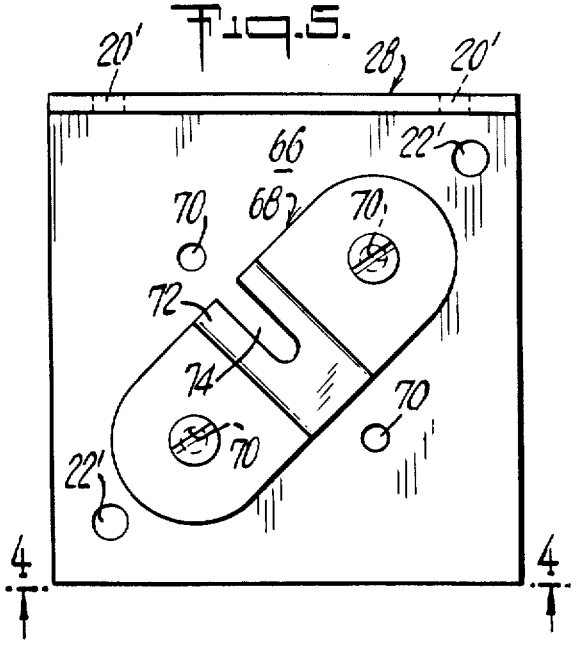
FIG. 5 is a detail view of the other bracket taken along line 5—5 in FIG. 1 (and omitting the roll pin)
Figure 3:
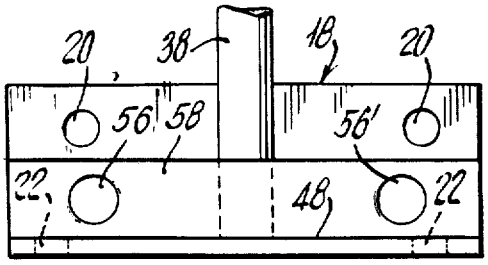
FIG. 3 is a detail view of the bracket of FIG. 2 taken along line 3—3 in FIG. 2.
Figure 4:
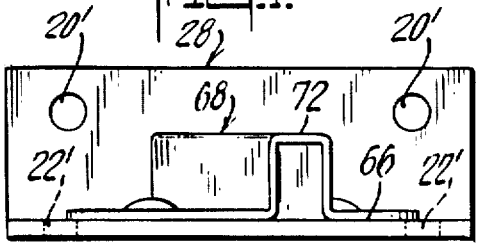
FIG. 4 is a detail view of the bracket of FIG. 5 taken along line 4—4 in FIG. 5.

As can be readily appreciated, hub 30 is approximately the same in diameter as the diameter of the recess indicated by the arrows 62 in FIG. 2. When the hub is installed on the bracket, the bead chain is entrained in the recesses 56 or 56', as the case may be, between the hub 30 and the overhanging portions 64 of the bracket.

The channels 56 and 56' will permit the bead chain to exit and hang down from the bracket regardless of whether the bracket is mounted to the wall, ceiling or window frame.

Referring now to the other end of the roll 10, bracket 28 is seen to be similar in external appearance to bracket 18. This permits it to be mounted in the same manner as bracket 18 to provide an aesthetically balanced effect for the window roller assembly. However, the face 66 of this bracket is different than the face of bracket 18. Bracket 28 is provided with a mounting panel 68 which in turn is mounted on the bracket face via a pair of screw receiving openings 70.

The mounting panel 68 is provided with a raised section 72 which has an elongated slot 74 therein for rotatably receiving the pin 24.

In its preferred form, the brackets 18 and 28 have their respective roll operating mechanism 16 and mounting panel 68 pre-assembled thereon. The brackets are then affixed to the ceiling wall or frame surrounding the window. Roll 10 is then brought into position by first placing opening 12 over the roll operating mechanism.

With two or even four operating pins 52, it will be appreciated that the roll 10 may pivot on the pins in all directions, the extent of pivoting motion being limited only by contact of the steel bumpers 76 or contact of the washer and nut assembly 46 with the inside wall of the roll. This then permits the roll to be moved into position and pin 24 dropped into the slot 74 in mounting panel 68 to complete the installation. Adjustments in horizontal tilt of the roll may then be made by simply moving mounting panel 68 to correct for alignment error.

The bumpers preferably fill the space between the hub extension 32 and roll 10 so that play in the roll diameter is eliminated, and the roll can turn silently and not deviate from level.

Figure 6:
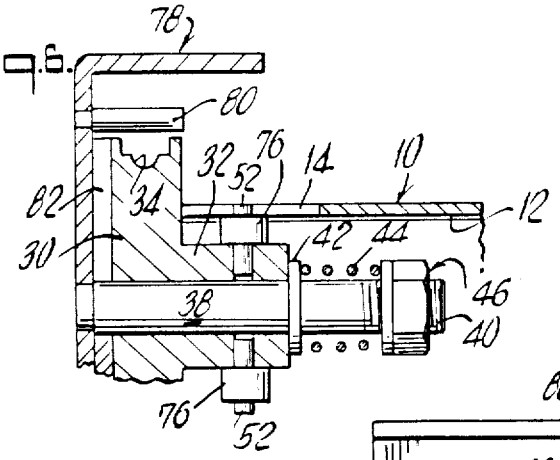
FIG. 6 is a partial detail view showing the upper half of another embodiment of a roller assembly in accordance with the invention and including the bracket which accepts the roll operating device.

FIG. 6 depicts another embodiment in which the mounting bracket 18 is replaced by a bracket 78 which, instead of the type of overhangs 64 shown in FIG. 2, is provided with a plurality of overhangs consisting of plates 80 spaced around the circumference of the hub 30 to retain the bead chain in place. In addition, a face of leather or other friction material 82, as shown in dotted lines in FIG. 6, may be used in both embodiments described above if it is desired to help insure consistent friction loading on the hub 30.

Figure 7:
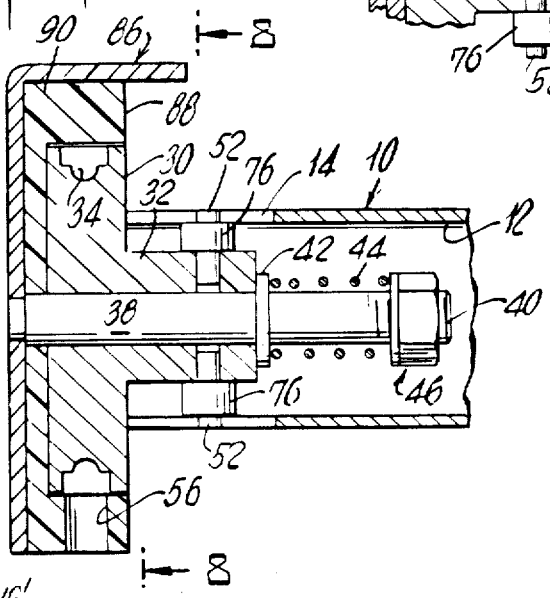
FIG. 7 is a detail view of still another embodiment of a window shade roller assembly in accordance with the present invention.
Figure 8:
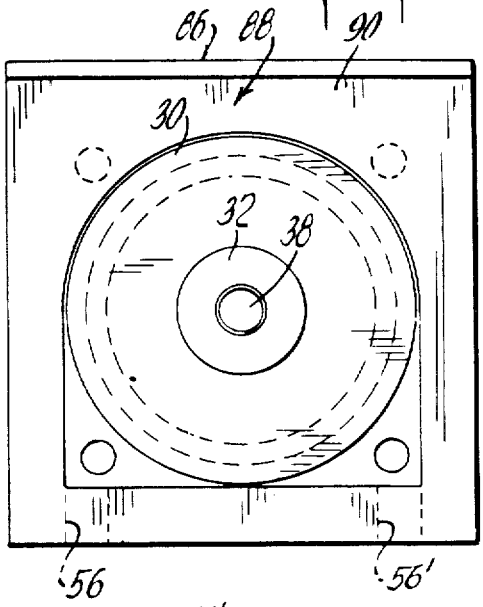
FIG. 8 is a detail view of the bracket in the embodiment of FIG. 7, the said detail taken along line 8—8 in FIG. 7.

The embodiment shown in FIGS. 7 and 8 utilizes a bracket 86 which is somewhat different from the bracket 18. In this embodiment, a separate insert 88 having an arched overhang 90 is fixedly mounted to the bracket 86, the overhang 90 retaining the bead chain (not shown) in the link depressions 34 after the hub has been placed on the bracket. The insert 88 may be made of any material, such as plastic, to give consistent friction loading on the hub for the reasons set forth above. In addition, the insert 88 and its corresponding recess may be other than round to prevent rotation without the use of mounting screws.

Figure 9:
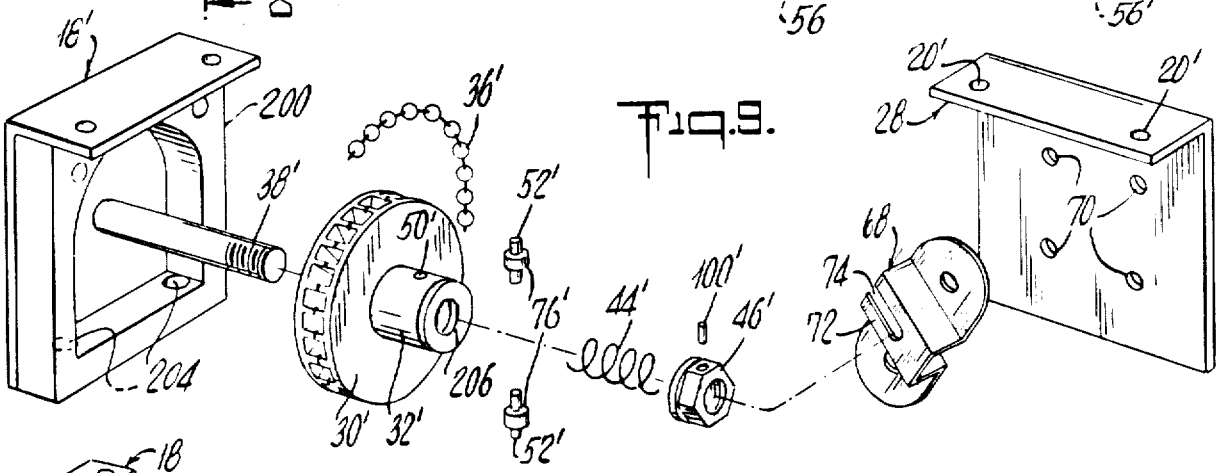
FIG. 9 is an isometric view of still another preferred embodiment of the present invention.

FIG. 9 discloses still another preferred embodiment of the present invention. The bracket 18' is simpler in construction as compared to the bracket 18 shown in FIG. 1. A face plate 200, which can be an injection molded plastic part, is secured to bracket 18' by conventional screws (not shown). Face plate 200 is further provided with elongated bores 204 into which the bead chain 36' is fed. Hub 30' is in the form of a paddle wheel and is designed to accept one bead, or more if desired, between adjacent paddles. The bead chain 36' exits the face plate 200 through bores 204.

Paddle 30' has a bore 206 to permit mounting of the paddle and the hub extension 38', which is in turn mounted on bracket 18'. Extension or plug 32' accepts operating pins 52' and in turn mounts on extension 38'. The assembly is completed by spring 44' and nut and washer assembly 46', in the same manner as in the other embodiments described in this specification.

The face plate 200 can be oriented in any of three different positions on the bracket 18'. For instance, the face plate can be mounted so that bores 204 have their axes oriented parallel to the top portion 54', instead of perpendicular thereto as shown in the drawing. This will permit the bracket 18' to be mounted to the frame of the window, or to the ceiling, as desired. The face plate is simply repositioned to orient the bead chain vertically.

Figure 10:
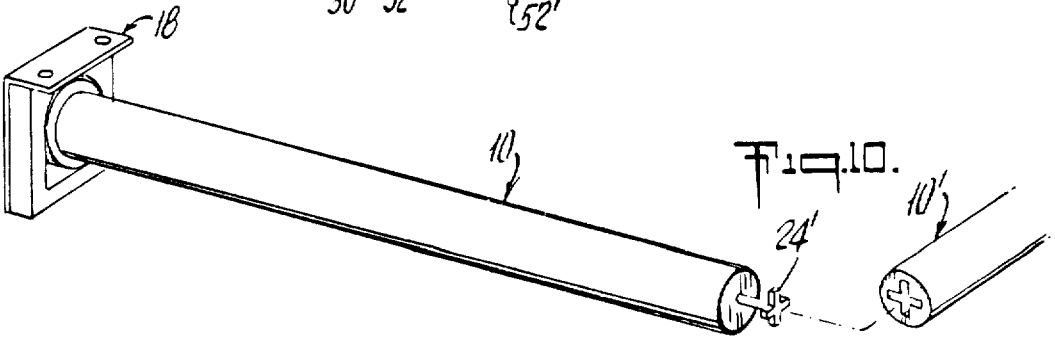
FIG. 10 is an isometric view of an embodiment in accordance with the invention in which the window shade rollers are ganged.

The shade rollers may be ganged to cover multiple windows, the drive being taken from one bracket and hub assembly of the type denoted by the numerals 18, 18' in the foregoing embodiments. To achieve this, pin 24' (FIG. 1) is fitted into the leading end of the other roll (See FIG. 10). Pin 24' is preferably provided with a cross-shape as shown, which fits into a corresponding cross-shaped opening in the second roll. Alternatively, the bracket 18' can be placed in the center, between the two rolls. Any number of ganged rolls can be used. However, it has been found desirable to use a conventional detent (not shown) in connection with the bead chain to prevent gravity forces from unwinding the shades due to the weight loading of the multiple shade system.

Figure 13:
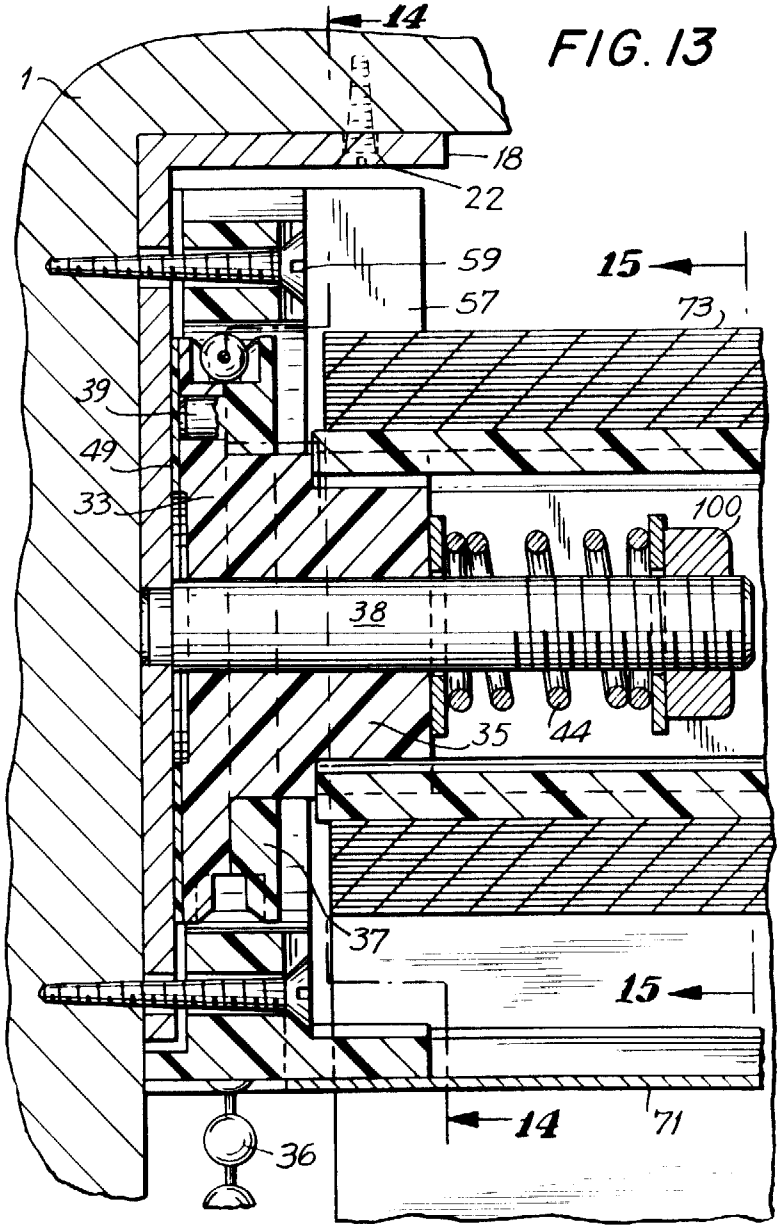
FIG. 13 is a partial vertical cross-sectional view along the line 13—13 of FIG. 11.
Figure 14:
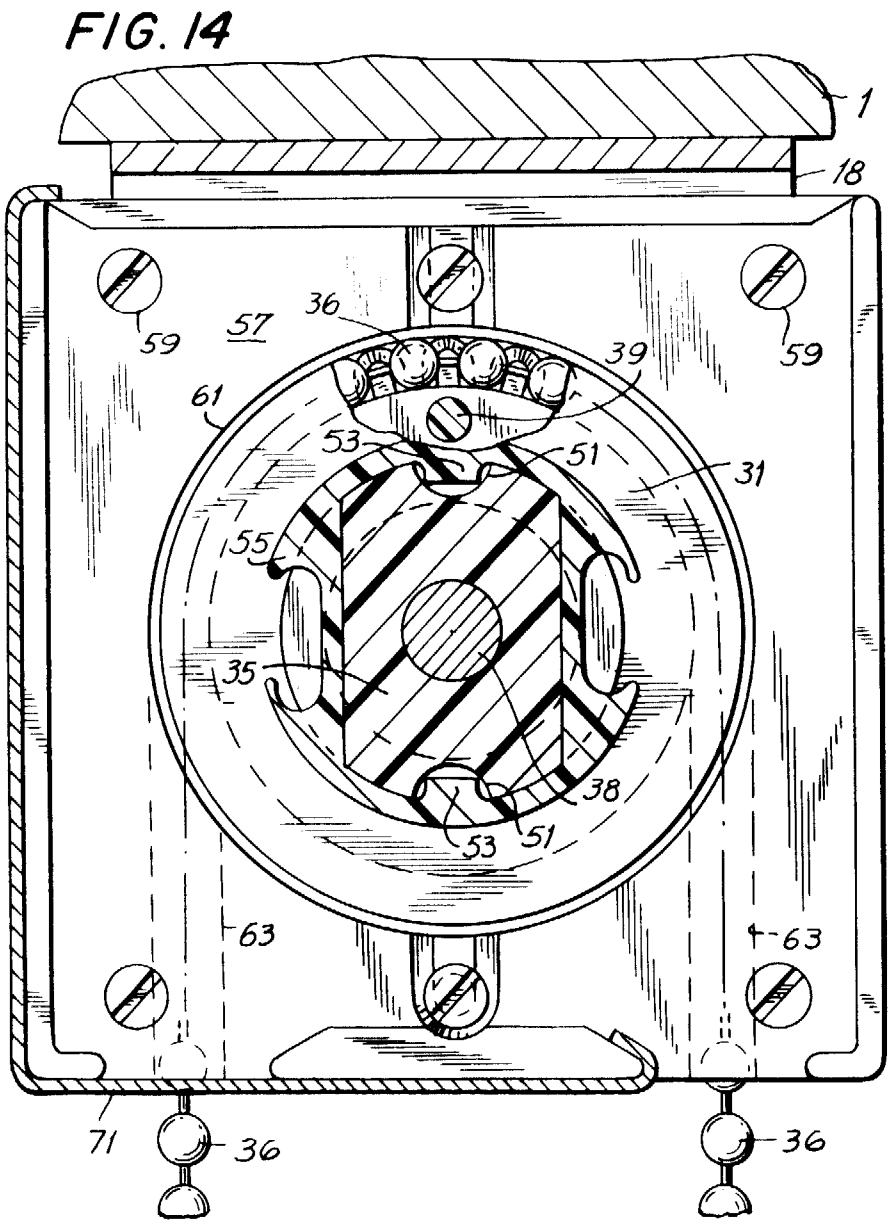
FIG. 14 is a cross-sectional view along the line 14—14 of FIG. 13.

Turning now to the form of roller shade mounting and drive shown in FIGS. 11, 13 and 14, the bracket 18 is again provided with mounting holes and a nonrotatable projecting pin 38 welded thereto on which is journaled a modified form of sprocket wheel 31.

As shown more clearly in FIGS. 11, 12 and 13, the internal drive is in the form of a modified sprocket wheel and is preferably formed of two sections molded together, i.e., a principal section 33 having a hub 35, rotatably mounted on pin 38, and a complementary section 37 mounted on hub 35 and joined to section 33 through pin extensions 39 fitting into appropriate receiving holes 41. There are preferably a plurality of such pins equally spaced about the meeting surface of section 37 and molded into section 33 to form the unitary sprocket wheel 31.

As is more clearly shown in FIG. 12, the peripheries of the two sections 33 and 37 are formed with cut-out portions containing complementary teeth 43 and 45 which when the two sections are joined form individual spaced pockets into which the individual beads of bead chain 36 fall to permit movement and control of the sprocket wheel and the movement of the shade roll as a whole, these pockets preventing the bead chain from riding up and hitting the top of the retainer. There are preferably 24 of these teeth spaced at 15°. The sprocket wheel is preferably formed of a mouldable plastic such as "Delrin".

About the inner face of sprocket wheel 31, i.e., the face opposing the bracket 18, and more particularly the face of section 33, there is mounted a flat annulus of frictional material 49.

It will thus be apparent that as in the form of invention shown for example in FIG. 1, through the use of spring 44 and nut 100 in the threaded end of pin 38, the face of sprocket wheel 31 is urged against the vertical face of bracket 18, except that in this case the interposed frictional material 49 controls the drag on the roller shade instead of direct friction per se between these two parts. It differs in this respect from the form of invention above described in reference to FIG. 6 in which frictional material is interposed between the entire opposed surfaces of the sprocket wheel and bracket. The type of construction illustrated in FIGS. 11 and 13 permits better frictional control when, for example, the opposed surfaces are not exactly in parallel and thus better takes care of tolerances in manufacture. Adjustment of the friction for supporting the weight of the extended shade is accomplished through spring 44 and nut 100, as previously described. This adjustment is readily available upon removal of the shade roller.

Attachment of the sprocket wheel to the shade roll is effected in this embodiment by providing the hub 35 with a pair of opposed recesses 51 engageable by a pair of inward extensions 53 on hollow shade roll 55.

Surrounding the sprocket wheel 31 and the interconnection between it and the shade roll is an end cover 57 which may be attached to the vertical face of the bracket 18 or directly to the window frame as by screws 59. The end cover has an opening 61 of such diameter that it forms a retainer surrounding sprocket wheel 31 being spaced therefrom only such distance as to aid in preventing the bead chain from leaving the pockets in the periphery of the wheel. Appropriate openings 63 in the lower end of the cover permit passage of the bead chain.

For supporting the idle end of the shade roll a bracket 18' (FIG. 17) is provided, identical in all substantial respects to bracket 18, and this is surrounded by end cover 57' which again is substantially the same as end cover 57 except that no openings are provided for a bead chain. An adjustable support 65 receives idle end pin 67 which in turn fits in plug 69 of the shade roll.

The entire front of the roller shade assembly is preferably covered by a facia 71 (see FIG. 1a) extending across the upper portion of the window frame and snapped on the end covers as shown in FIGS. 14 and 16. This facia may be made of metal or suitable springable plastic material. This construction avoids the use of screws and provides a tight fit against the ceiling or window frame.

A preferred manner of attaching the shade to the roller is illustrated in FIG. 15 in which one end of shade 73 is attached to a spring clip 75 and fits into a slot 77 extending longitudinally the length of the roll 55. This arrangement facilitates a change in shades without removing the roller. By providing the roller with opposed slots, the use of a double shade is made possible, as illustrated.

Many modifications in and to the above-described embodiments will be apparent to those of ordinary skill in the art. It is intended to cover all such modifications which fall within the spirit and scope of the invention as defined in the claims appended hereto.

What we claim is:

1. A window shade roll assembly comprising in combination:

a shade roll;

a first support apparatus organized at a first end of the shade roll, a second support apparatus for supporting rotatably a second end of the shade roll;

an operator system on said first support apparatus including:

a mounting plate on said first support apparatus having a pin extending therefrom axially of the shade roll and into the shade roll, a wheel mounted rotatably about the pin on said first support apparatus and having a face arranged in juxtaposition to the mounting plate.

the wheel having a hub of a diameter smaller than the shade roll and projecting therefrom opposite the face, means for connecting detachably the hub that is on said first support apparatus to the shade roll.

biasing means connected to the hub for causing frictional contact of the face of the wheel against the mounting plate, and a wheel turner mechanism;

the window shade roll assembly characterized in that all of the elements of said operator system are mounted on the first support apparatus.

2. The window shade roll assembly according to claim 1 characterized further in that the biasing means includes:

a spring mounted on the pin inwardly relative to the shade roll and beyond the hub for said biasing of said entire face of the wheel against the mounting plate, tensioning means mounted on a free end of the pin and organized for controlling tension of the spring.

3. The window shade roll assembly according to claim 1 characterized further in that the wheel turner mechanism includes:

the wheel provided with a plurality of circumferentially spaced indentations, a bead chain having a plurality of beads for seriatim engagement of the indentations as the wheel is rotated.

4. The window shade roll assembly according to claim 1 characterized further in that the means for connecting detachably the hub to the shade roll includes a plurality of projections extending radially from the hub in detachable engagement with the shade roll.

5. A window shade roll assembly comprising in combination:

a shade roll;

a first support apparatus organized at a first end of the shade roll, a second support apparatus for supporting rotatably a second end of the shade roll;

an operator system including:

a mounting plate having a pin extending therefrom axially of the shade roll, a wheel mounted rotatably about the pin and having a face arranged in juxtaposition to the mounting plate, the wheel having a hub of a diameter smaller than the shade roll and projecting therefrom opposite the face, means for connecting detachably the hub to the shade roll, biasing means connected to the hub for causing frictional contact of the face of the wheel against the mounting plate, and a wheel turner mechanism;

the window shade roll assembly characterized in that all of the elements of said operator system are mounted on the first support apparatus, the window shade roll assembly characterized further in that end covers enclose respectively the first and second ends of the shade roll, each of the end covers provided with a mounting means, a flexible fascia engagable with both of the mounting means and spanning between the end covers and adapted to cover entirely the window shade roll assembly from one side.

*6. A window shade roll assembly for use with a shade roll having a first and a second end, comprising:*

*a first support apparatus constructed and arranged to be mounted adjacent to the first end of the shade roll;*

*a second support apparatus constructed and arranged to be mounted adjacent to the second end of the shade roll for rotatably supporting the second end of the shade roll; and,*

*an operator system mounted on said first support apparatus, said operator system including securing means for removably securing the shade roll to the operator system, said securing means including a mounting plate having a pin extending therefrom axially of and into the shade roll for operatively and detachably engaging the shade roll and the mounting plate, said operator system further including operating means for rotating the shade roll to adjust the height of a shade affixed to the shade roll; said securing means further including a wheel rotatably mounted with respect to the first support apparatus, and in operative engagement with the operating means so that the wheel rotates as the height of the shade is adjusted, said operating means further including a brake in operative engagement with said wheel and which prevents the shade roll from rotating and unwinding the shade which may occur due to the weight of a partially lowered shade;*

*wherein the assembly is characterized in that all of the elements of said operator system are mounted on said first support apparatus.*

*7. The window shade roll assembly of claim 6, wherein the brake is an adjustable frictional brake.*

*8. A window shade roll assembly for use with a shade roll having a first and a second end, comprising:*

*a first support apparatus constructed and arranged to be mounted adjacent to the first end of the shade roll;*

*a second support apparatus constructed and arranged to be mounted adjacent to the second end of the shade roll for rotatably supporting the second end of the shade roll; and,*

*an operator system the elements of which are mounted on one or the other of said support apparatuses, said operator system including securing means for removably securing the shade roll to the operator system, said securing means including a mounting plate having a pin extending therefrom axially of and into the shade roll for operatively and detachably engaging the shade roll and the mounting plate, said operator system further including operating means for rotating the shade roll to adjust the height of a shade affixed to the shade roll; said securing means further including a wheel rotatably mounted with respect to one of said support apparatuses, and in operative engagement with the operating means so that the wheel rotates as the height of the shade is adjusted, said operating means further including a brake in operative engagement with said wheel and which prevents the shade roll from rotating and unwinding the shade which may occur due to the weight of a partially lowered shade;*

*wherein the assembly is characterized in that all of the elements of said operator system are mounted on one or the other of said support apparatuses.*

*9. The window shade roll assembly of claim 8, wherein the brake is an adjustable friction brake.*

*10. A window shade roller assembly for use in a shade roll having a first and a second end, comprising:*

*a first support apparatus constructed and arranged to be mounted adjacent to the first end of the shade roll;*

*a second support apparatus constructed and arranged to be mounted adjacent to the second end of the shade roll for rotatably supporting the second end of the shade roll; and,*

*an operator system, mounted on one or the other of said support apparatuses and including securing means having a mounting plate with a pin extending axially therefrom and into the shade roll for removably and operatively securing the shade roll to the operator system; said operator system including operating means for rotating the shade roll to adjust the height of a shade affixed to the shade roll; said operator system further including a hub rotatably mounted with respect to one of said support apparatuses and in operative engagement with the shade so that the hub rotates as the height of the shade is adjusted; said operator system still further including a brake in operative engagement with said hub and which prevents the shade roll from rotating and unwinding the shade which may occur due to the weight of a partially lowered shade;* wherein the assembly is characterized in that each of the elements of said operator system are mounted on one or the other of said support apparatuses.

*11. The window shade roll assembly of claim 10, wherein the brake is an adjustable friction brake.*

* * * * *